(12) United States Patent
Speranza et al.

(10) Patent No.: US 12,254,240 B2
(45) Date of Patent: Mar. 18, 2025

(54) CONTROLLING AUDIO OUTPUT IN A VEHICLE

(71) Applicant: BlackBerry Limited, Waterloo (CA)

(72) Inventors: Roberto Speranza, Mississauga (CA); Pierre Pierre Blais, Kanata (CA)

(73) Assignee: BlackBerry Limited, Waterloo (CA)

( * ) Notice: Subject to any disclaimer, the term of this patent is extended or adjusted under 35 U.S.C. 154(b) by 238 days.

(21) Appl. No.: 17/968,965

(22) Filed: Oct. 19, 2022

(65) Prior Publication Data

US 2024/0134593 A1 Apr. 25, 2024
US 2024/0231747 A9 Jul. 11, 2024

(51) Int. Cl.
*G06F 3/16* (2006.01)
*H04R 3/00* (2006.01)

(52) U.S. Cl.
CPC ............... *G06F 3/165* (2013.01); *H04R 3/00* (2013.01); *H04R 2430/01* (2013.01); *H04R 2499/13* (2013.01)

(58) Field of Classification Search
CPC ....... G06F 3/165; H04R 3/00; H04R 2430/01; H04R 2499/13
USPC .......................................... 381/86, 302, 300
See application file for complete search history.

(56) References Cited

U.S. PATENT DOCUMENTS

| | | | |
|---|---|---|---|
| 5,081,707 A | | 1/1992 | Schorman et al. |
| 10,332,495 B1 | * | 6/2019 | Mortensen ........... G10H 1/0008 |
| 2007/0182525 A1 | | 8/2007 | McCarthy et al. |
| 2019/0165750 A1 | * | 5/2019 | Goldman-Shenhar ...................... H03G 7/007 |
| 2020/0042285 A1 | * | 2/2020 | Choi ....................... G10L 25/84 |

OTHER PUBLICATIONS

Andersson, "The Common Vehicle Interface Initiative" ITU FG-VM, Apr. 12, 2021, 46 pages.
Extended European Search Report in European Appln. No. 23204023.8, mailed on Mar. 21, 2024, 9 pages.

* cited by examiner

*Primary Examiner* — Thjuan K Addy
(74) *Attorney, Agent, or Firm* — Fish & Richardson P.C.

(57) ABSTRACT

Systems, methods, and software can be used to control audio output of a vehicle. In some aspects, a method includes:
determining, at a vehicle, a current driving mode of the vehicle;
determining, at the vehicle, a plurality of audio output levels based on the current driving mode and one or more preconfigured audio zone profiles; and controlling, by the vehicle, audio equipment of the vehicle to output audio according to the plurality of audio output levels.

20 Claims, 3 Drawing Sheets

CONTROLLING AUDIO OUTPUT IN A VEHICLE

TECHNICAL FIELD

The present disclosure relates to controlling audio output in a vehicle.

BACKGROUND

A vehicle can include audio equipment that provides audio output from different sources. Examples of these sources include AM/FM radio, CD players, DVD players, Blue-ray players, navigation systems, Bluetooth telephone integration, and smartphone controllers like CarPlay and Android Auto. The audio output can be provided though one or more speakers, installed inside the vehicle.

DESCRIPTION OF DRAWINGS

Like reference numbers and designations in the various drawings indicate like elements.

DETAILED DESCRIPTION

Figure 1:
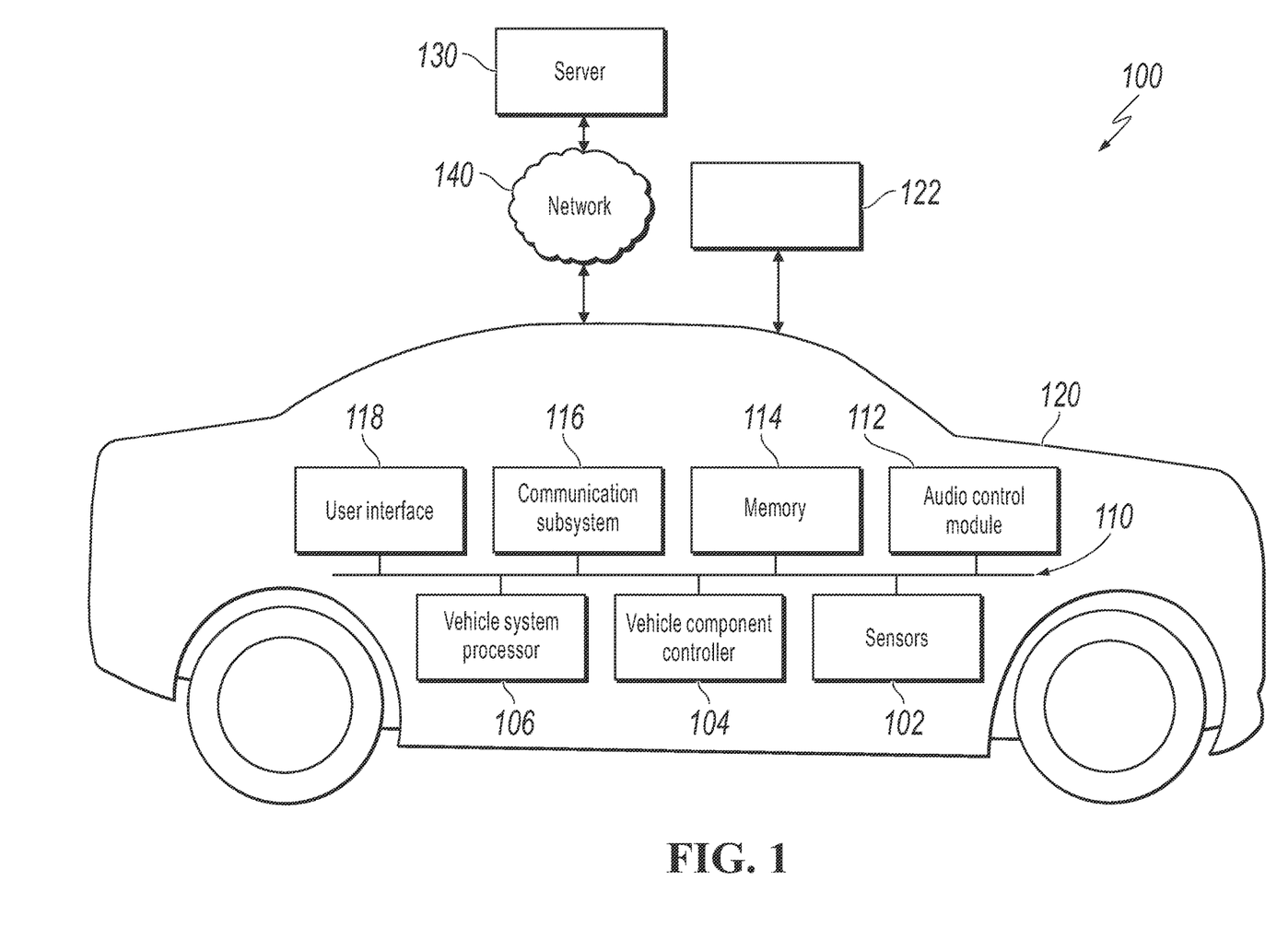
FIG. 1 is a schematic diagram showing an example communication system that controls the audio operation in a vehicle, according to an implementation.
Figure 2:
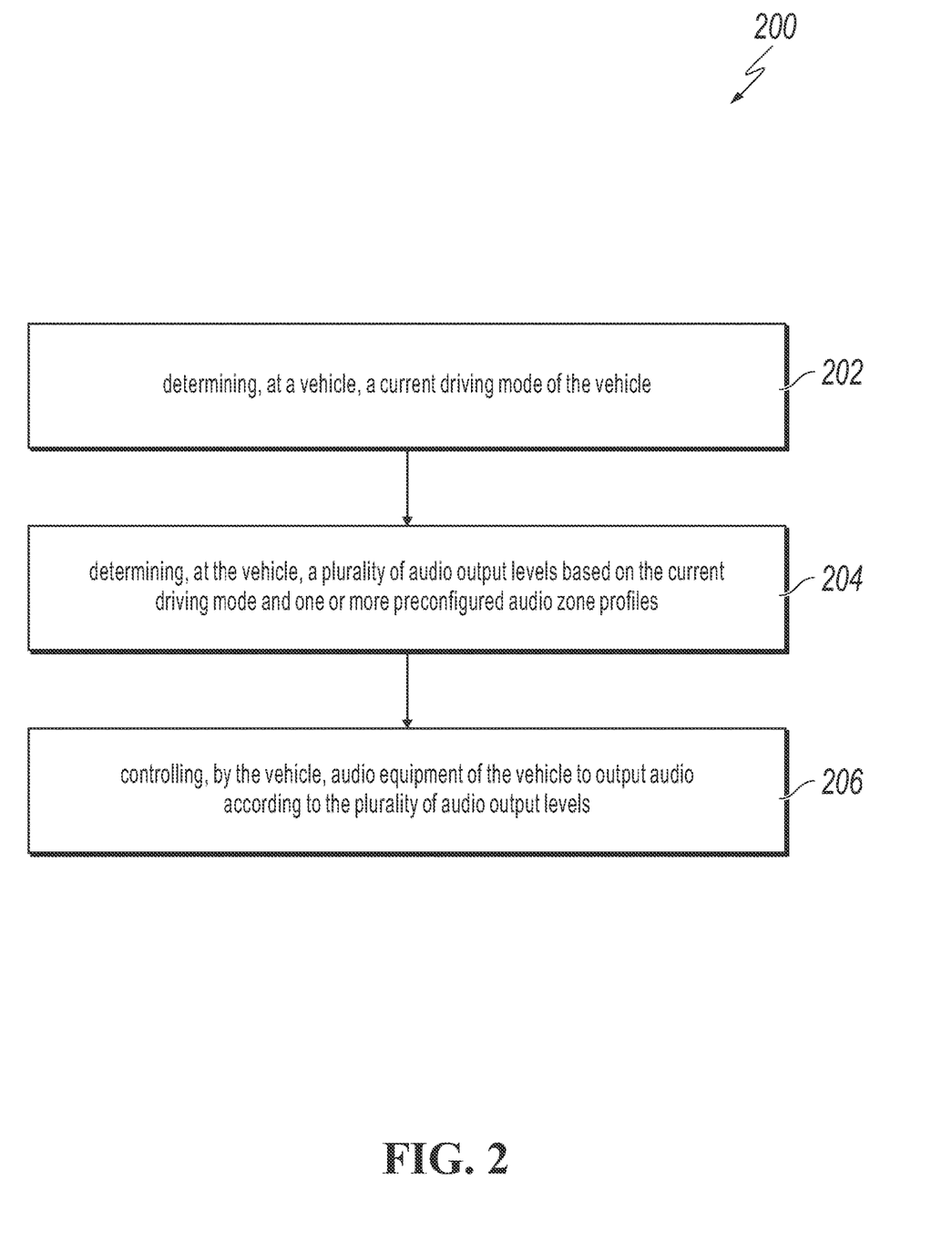
FIG. 2 is a flow diagram showing an example method that controls audio output in a vehicle, according to an implementation.
Figure 3:
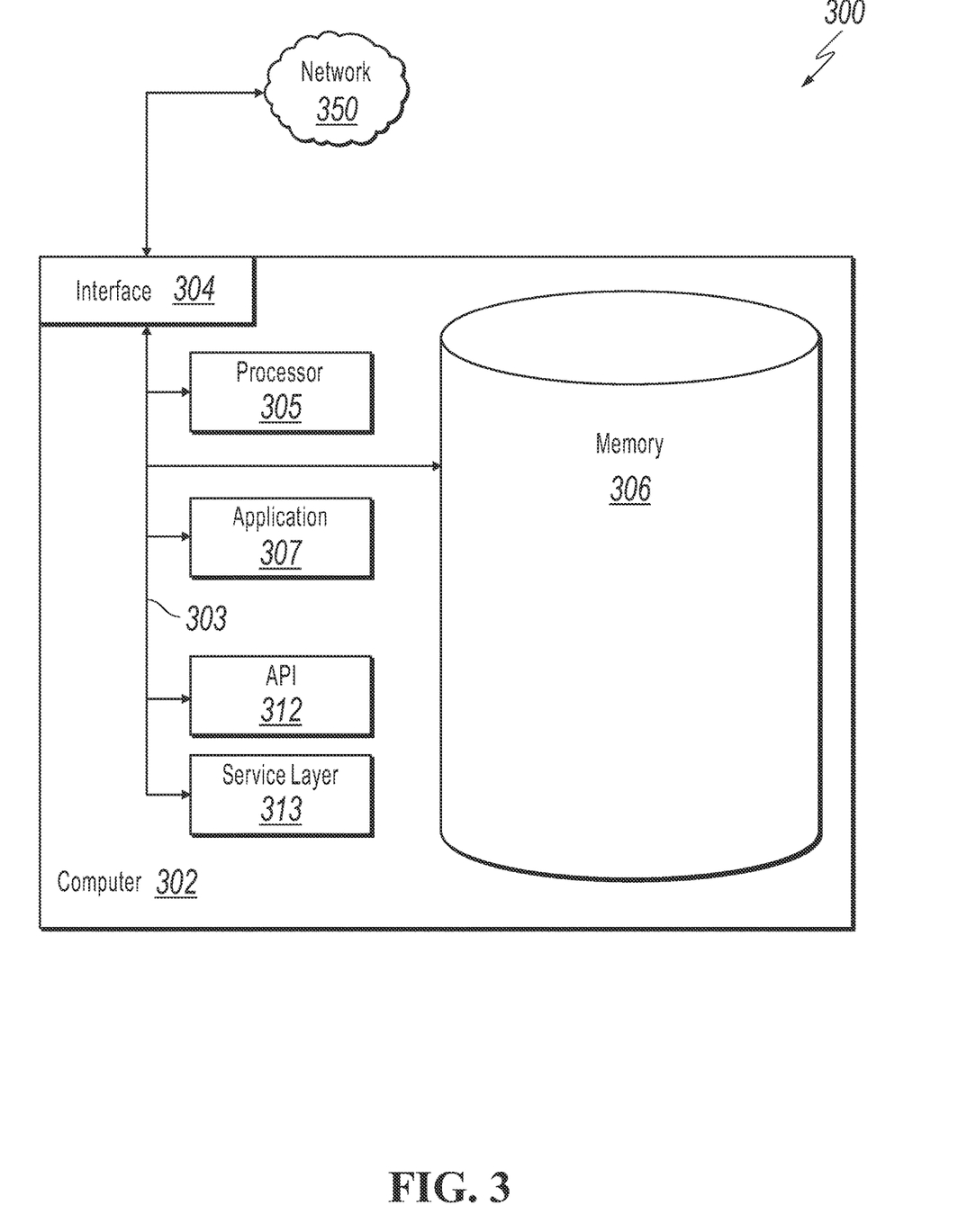
FIG. 3 is a high-level architecture block diagram of a computing system, according to an implementation.

In some cases, a vehicle can control the audio output of the speakers or audio equipment. Different audio output levels can be preconfigured using audio zone profiles. These profiles can be configured for different driving modes of the vehicle. The vehicle can determine the current driving mode and select the corresponding audio zone profile. The vehicle can determine the audio output levels based on the audio output levels configured in the audio zone profile. The vehicle can control the speakers to output the audio according to the audio output levels. FIGS. 1-3 and associated descriptions provide additional details of these implementations. The approach described in this disclosure provides a way to customize the audio output operation of the vehicle. This approach further simplifies the user interactions for the audio output operation of the vehicle and improves user experience.

In some cases, the audio output can be specified or controlled by using a signal format according to a standardized protocol. The protocol can be used to configure the audio output levels in the audio zone profile, and to communicate with the firmware of the vehicle to transmit data objects related to the audio output operations. The approach described in this disclosure improves interoperability of software modules that perform the operation of audio output control, as discussed previously. It enables the software modules to be easily adapted to different firmware and operating systems of the vehicle.

FIG. 1 is a schematic diagram showing an example communication system 100 that controls the audio operation in a vehicle, according to an implementation. At a high level, the example communication system 100 includes a vehicle 120 that is communicatively coupled with an electronic device 122. The vehicle 120 is also communicatively coupled with a server 130 over a network 140.

The vehicle 120 can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the vehicle 120 includes one or more sensors 102, a vehicle component controller 104, a vehicular system processor 106, a communication subsystem 116, a user interface 118, memory 114, and an audio control module 112, that are connected to a bus 110.

In some cases, a vehicle can include one or more sensors. The one or more sensors can generate inputs, e.g., video or audio inputs, that reflect the surroundings or environment inside of the vehicle. Examples of the sensors can include cameras, microphones, laser, radar, ultrasonic, light detection and ranging (LIDAR) or any other sensors.

The vehicle 120 includes one or more sensors 102 that detect or measure information for the vehicle 120. Examples of the sensors 102 can include sensors that capture environmental information that is external to the vehicle 120, such as cameras, microphones, laser, radar, ultrasonic, light detection and ranging (LIDAR), and the like. These sensors can provide environmental inputs for an automatic processing platform operating on the vehicle 120 to make automatic decisions. Examples of the sensors 102 can also include devices that capture information that is internal to the vehicle 120, such as monitors for components such as engine, battery, fuel, electronic system, cooling systems, and the like. These sensors can provide operation status and warnings to the automatic processing platform operating on the vehicle 120. Examples of the sensors 102 can also include acoustic sensors that can detect the sound level inside the vehicle 120. The acoustic sensors can determine the noise level inside the vehicle 120 or provide input to other signal processors that determine the noise level.

The vehicle 120 includes a vehicle component controller 104. Although illustrated as a vehicle component controller 104 in FIG. 1, the vehicle 120 can include two or more vehicle component controllers 104. The vehicle component controller 104 represents a controller that controls the operation of a component on the vehicle 120. Examples of the components can include engine, accelerator, brake, radiator, battery, steering wheel, transmission system, cooling system, electrical system, entertainment system, and any other components of the vehicle 120. For example, the vehicle component controller 104 can control the speaker system of the vehicle 120, including controlling the volume, balance, fade, and any other settings for audio output inside the vehicle 120. The vehicle component controller 104 can operate a respective component automatically, according to input from the vehicular system processor 106, or a combination thereof. In some implementations, the vehicle component controller 104 can include a data processing apparatus.

The vehicular system processor 106 can include one or more processing components (alternatively referred to as "processors" or "central processing units" (CPUs)) configured to execute instructions related to one or more of the processes, steps, or actions for the automatic processing platform operating on the vehicle 120. Generally, the vehicular system processor 106 executes instructions and manipulates data to perform the operations of the automatic processing platform. The vehicular system processor 106 can receive inputs from the sensors 102 and generate commands to the vehicle component controller 104. In some cases, the vehicular system processor 106 can perform automatic operations. In some cases, the vehicular system processor 106 can include a data processing apparatus.

The communication subsystem 116 can be configured to provide wireless or wireline communication for data or control information of the vehicle 120. For example, the communication subsystem 116 can support transmissions over wireless local area network (WLAN or WiFi), near field communication (NFC), infrared (IR), Radio-frequency identification (RFID), Bluetooth (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include an I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the vehicle 120 and various other computer-executable software programs for performing one or more of the processes, steps, or actions described above.

The audio control module 112 represents an application, a set of applications, software, software modules, hardware, or any combination thereof that can be configured to determine the audio output level inside the vehicle 120. Examples of audio output levels include volume, balance, fade, or the like.

In some implementations, the audio control module 112 can determine or be informed of a current driving mode of the vehicle 120. The audio control module 112 can determine the audio output levels of the speakers inside the vehicle 120 based on the current driving mode and preconfigured audio zone profiles. The audio zone profiles can be configured through the user interface 118, the electronic device 122, or any combination thereof. The audio control module 112 can send the determined audio output levels to the vehicle component controller 104. The vehicle component controller 104 can control the speaker to output audio according to these determined audio output levels. FIG. 2 and associated descriptions provide additional details of these implementations. In some implementations, the audio control module 112 can be implemented as a separate software program or part of a software program stored in the memory 114 and executed by the vehicular system processor 106.

As illustrated, the bus 110 provides a communication interface for components of the automatic processing platform operating on the vehicle 120. In some cases, the bus 110 can be implemented using a Controller Area Network (CAN) bus.

The electronic device 122 represents an electronic device that connects with the vehicle 120 for data transfer. The electronic device 122 may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless or wired communication network. The electronic device 122 can also be a peripheral device, such as a headset, a remote controller, or a display.

The electronic device 122 can connect with the vehicle 120 using short-range communication technology. The short-range communication technology can be wireless, such as BT, NFC, WLAN. The short-range communication technology can also be wired, such as USB.

In some implementations, the electronic device 122 can be used to configure the audio zone profiles discussed previously. For example, a user can use an application on the electronic device 122 to set or change audio zone profiles, and the electronic device 122 can send the audio zone profiles to the vehicle 120. The electronic device 122 can also be used to further adjust the audio output levels while the speakers are outputting audio signals.

The server 130 represents an application, a set of applications, software, software modules, hardware, or any combination thereof that can be configured to manage audio zone profiles of the vehicle 120. In some implementations, the server 130 can receive, store, and adjust the audio zone profiles, and send the updated audio zone profiles to the vehicle 120.

The example communication system 100 includes the network 140. The network 140 represents an application, set of applications, software, software modules, hardware, or combination thereof, that can be configured to transmit data between the server 130 and the vehicle 120 in the communication system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within its coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that controls audio output in a vehicle, according to an implementation. The method 200 can be implemented by the entities shown in FIG. 1, including, for example, the vehicle 120. The method 200 shown in FIG. 2 can also be implemented using additional, fewer, or different entities. Furthermore, the method 200 shown in FIG. 2 can be implemented using additional, fewer, or different operations, which can be performed in the order shown or in a different order. In some instances, an operation or a group of operations can be iterated or repeated, for example, for a specified number of iterations or until a terminating condition is reached.

At 202, the vehicle determines the current driving mode of the vehicle. In some implementations, the vehicle can determine the current driving mode based on the values of the current driving operation parameters of the vehicle. Examples of the current driving operation parameters include speed, direction, acceleration, gear position, or the like. These driving operation parameters can be obtained through the sensors in the vehicle, the vehicle system processor, or a combination thereof. In some cases, the current driving mode can be determined based on the values of the driving operation parameters comparing with a set of thresholds over a preset duration. The values of the thresholds and the preset duration can be configured. In one example, the vehicle can determine that the current driving mode is a nap mode when the vehicle has been in idle gear over 5 minutes, based on the configuration. In another example, the vehicle can determine that the current driving mode is a highway mode when the average speed of the vehicle is above 60 mile/hour for over 10 minutes. Alternatively or in combination, the current driving mode can be determined further based on other information, including e.g., the occupants of the vehicle, the location of the vehicle, the time of the day, and the noise level inside or outside the vehicle. For example, the vehicle can determine that the current driving mode is a nap mode when the vehicle has been in idle gear and the location of the vehicle is in a highway rest stop. In some cases, the vehicle determines a nap mode when the user enters information via the user interface on the vehicle or via an application on an external electronic device connected to the vehicle to indicate that the user would like to take a nap. In some cases, the vehicle determines a nap mode when the vehicle sensors detect that the seat is reclined and the vehicle is not moving. In another example, the vehicle can determine that the current driving mode is noisy mode when the noise of the vehicle (or the noise level inside the vehicle) exceeds a configured threshold. Furthermore, the vehicle can determine the current driving mode based on whether other operations are performed in the vehicle. For example, the vehicle can determine that the current driving mode is the Bluetooth mode when the vehicle detects that a Bluetooth communication is present. If the vehicle sensors detect a car seat with a baby in the vehicle, the current driving mode can be determined as a baby-on-board mode. If the vehicle sensors detect ambulance/police car/fire truck siren or a loud sound in the proximity of the vehicle, the current driving mode can be determined as an alerting mode. If the vehicle sensor detects the night time, the current driving mode can be a night mode.

In some implementations, the current driving mode can be inputted by the driver or other persons in the vehicle through a user interface of the vehicle, or through an electronic device that connects to the vehicle. Additionally, or alternatively, the vehicle can further adapt the configuration of driving mode for a particular driver by using a machine learning algorithm.

At 204, the vehicle determines a plurality of audio output levels based on the current driving mode and preconfigured audio zone profiles. Each preconfigured audio zone profile includes a set of audio output levels for a corresponding driving mode. The plurality of audio output levels can include volume, fade, balance and other audio output parameters for different speakers in the vehicle. For example, for the nap mode, the volume may be set to a low number. For the highway mode, the volume may be set to an average number. For the noisy mode, the volume may also be set to a high number. For the baby-on-board mode, the volume of the rear section of the vehicle may be set to a low number. For the altering mode, the volumes of both the front and rear sections of the vehicle may be set to a low number or the audio can be turned off. In some cases, the preconfigured audio zone profiles can also include audio programs corresponding to each driving mode, e.g., a soothing melody for the nap mode, a music selection for the highway mode, children's songs for the baby-on-board mode, loud and active music for the night mode to keep the driver awake, and etc.

In some cases, the preconfigured audio zone profiles can be set by the manufacturer of the vehicle as default. Alternatively, or additionally, the preconfigured audio zone profiles can be set or changed by the user or any persons in the vehicle through the user interface of the vehicle. The preconfigured audio zone profiles can also be configured through an electronic device connected to the vehicle, or through a server connected to the vehicle, or both.

The vehicle can select the preconfigured audio zone file that matches the current driving mode and use the audio output levels in the preconfigured audio zone as the current audio output levels. In some cases, the vehicle can output the determined audio output levels through a user interface of the vehicle, and a user can further adjust the audio output levels (for example, by using dial, button, knob, touch screen, or other input mechanism provided by the user interface). The vehicle can further save the user-adjusted audio output levels in the preconfigured audio zone file for future use. The vehicle can also prompt the user to select whether the user-adjusted audio output levels should be saved in the preconfigured audio zone file for future use and save the user-adjusted audio output levels if the user confirms. Alternatively, or in combination, the user can use the electronic device or the server to view the audio output levels and adjust accordingly.

At 206, the vehicle controls the audio equipment of the vehicle to output audio according to the audio output levels. In some implementations, the control system of the vehicle is implemented with different layers. The lower layers include firmware of the physical equipment that controls the operation of the equipment, such as speakers in the speaker system of the vehicle. The higher layers include controlling software that accesses the modules in the lower layers. In some cases, the modules in the lower layer can be specific to the supplier of the physical equipment, the operating system of the vehicle, or both. Therefore, standardized signaling protocols may be used to provide consistent interface to these modules. This improves the portability of the software in the higher layer.

In one example, Vehicle Signal Specification (VSS) developed by Connected Vehicle Systems Alliance (COVESA) can be used to provide the common signaling protocol for vehicle signals. VSS introduces a domain taxonomy for vehicle signals that can be used as standard in automotive applications to communicate information around the vehicle. VSS defines vehicle signals, in a tree like structure, in the sense of classical attributes, sensors, and actuators with the raw data communicated over vehicle buses and data which is more commonly associated with the infotainment system alike. The VSS defines a catalogue of signals. More generally, a catalogue of signals is referred to herein as a "Signal Catalogue".

In some cases, audio input and output levels discussed previously can be defined using the signal structure or format of VSS. Tables 1-1 and 1-2 are an example of the signal structure/format for these data:

TABLE 1-1 example signal for audio input and output level (signal type and data type)

| Signal Name | Signal Type | Data Type |
|---|---|---|
| Vehicle.Cabin.AudioZone | branch | |
| Vehicle.Cabin.AudioZone.AudioProfile | actuator | string |
| Vehicle.Cabin.AudioZone.Loudness | actuator | string |
| Vehicle.Cabin.AudioZone.Soundfield | actuator | string |
| Vehicle.Cabin.AudioZone.Balance | actuator | int8 |
| Vehicle.Cabin.AudioZone.Fader | actuator | int8 |
| Vehicle.Cabin.AudioZone.Front | branch | |
| Vehicle.Cabin.AudioZone.Front.NoiseLevel | sensor | uint8 |
| Vehicle.Cabin.AudioZone.Front.Volume | actuator | uint8 |
| Vehicle.Cabin.AudioZone.Rear | branch | |
| Vehicle.Cabin.AudioZone.Rear.NoiseLevel | sensor | uint8 |
| Vehicle.Cabin.AudioZone.Rear.Volume | actuator | uint8 |
| Vehicle.Cabin.AudioZone.BlueTooth | branch | |
| Vehicle.Cabin.AudioZone.BlueTooth.NoiseLevel | sensor | uint8 |
| Vehicle.Cabin.AudioZone.BlueTooth.Volume | actuator | uint8 |

TABLE 1-2 example signal for audio input and output level (explanation)

| Signal Name | Explanation |
|---|---|
| Vehicle.Cabin.AudioZone | Properties related to sound presets. |
| Vehicle.Cabin.AudioZone.AudioProfile | Audio profile for the vehicle. Determines how audio is adjusted dynamically for listener preferences. |
| Vehicle.Cabin.AudioZone.Loudness | Loudness setting for the audio zone. ON - Loudness is enabled. OFF - Loudness is disabled. |
| Vehicle.Cabin.AudioZone.Soundfield | The soundfield for the vehicle audio, determining which region inside the vehicle the audio is focused. |
| Vehicle.Cabin.AudioZone.Balance | Balance for vehicle audio. −100 - fully left, 0 - balanced, 100 - fully right |
| Vehicle.Cabin.AudioZone.Fader | Fader setting for vehicle audio. −100 - fully rear, 0 - balanced, 100 - fully front |
| Vehicle.Cabin.AudioZone.Front | Sound presets for front section of vehicle. |
| Vehicle.Cabin.AudioZone.Front.NoiseLevel | Noise level in front section of vehicle. |
| Vehicle.Cabin.AudioZone.Front.Volume | Volume level for front section of vehicle. |
| Vehicle.Cabin.AudioZone.Rear | Sound presets for rear section of vehicle. |
| Vehicle.Cabin.AudioZone.Rear.NoiseLevel | Noise level in rear section of vehicle. |
| Vehicle.Cabin.AudioZone.Rear.Volume | Volume level for rear section of vehicle. |
| Vehicle.Cabin.AudioZone.BlueTooth | Sound presets for BlueTooth audio of vehicle, where they are controlled separately in vehicles. |
| Vehicle.Cabin.AudioZone.BlueTooth.NoiseLevel | Noise level in cabin when using Bluetooth audio. |
| Vehicle.Cabin.AudioZone.BlueTooth.Volume | Volume level for BlueTooth audio in vehicle. |

As seen from Table 1 above, a dot notates a name path to identify a component as a branch (a set of data entries) or a data entry (a sensor, actuator, or attribute). A sensor denotes a one-way signal originating from the vehicle (e.g., generated according to measurement of one or more sensors in the vehicle). An actuator denotes a two directional signal that can be set or get values (i.e., an actuator can be used to control a corresponding aspect of the audio of a speaker). A branch is a node in a tree structure. An attribute is typically a fixed value. The sensors/actuators typically have a publisher (or producer) that updates the signal value continuously when a change occurs in a sensor, while an attribute has a set value that should typically not change more than once per ignition cycle. In some cases, the signals in Table 1 can be implemented using Extensible Markup Language (XML), JavaScript Object Notation (JSON) scripts, or another encoding format.

In some implementations, an audio controller of the vehicle, e.g., the audio control module 112 discussed previously, can receive input from the sensors, e.g., the noise level in the front area of the vehicle, the noise level in the rear area of the vehicle, and the noise level when Bluetooth is used, from the sensors in the vehicle. The input can be received using the signal format in Tables 1-1 and 1-2, e.g., via the entries in Tables 1-1 and 1-2 with a signal type of sensor or actuator. The audio controller of the vehicle can determine different aspects of audio output levels, e.g., the volume level of the front speaker, the volume level of the rear speaker, the volume level when Bluetooth is operated based on the algorithm discussed previously, e.g., according to the current driving mode and the audio zone profiles. The determined audio output levels can be set using the signal format in Tables 1-1 and 1-2, e.g., via the entries in Tables 1-1 and 1-2 with a signal type of actuator. In some cases, the audio controller of the vehicle can further adjust the audio output levels based on the input received from the sensors. For example, the volume in the front can be increased by a configured amount if the noise in the front is over a configured threshold.

The audio controller can set the determined audio output levels by using the signal format in Table 1. These signals can be sent to the firmware of the speaker system, and enable the speaker system to output audio at different speakers according to these audio output levels.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the server 130 shown in FIG. 1. The computer 302 can be used to implement the electronic device 122 shown in FIG. 1, e.g., as a laptop computer or a smart phone. The computer 302 can also be used to implement the audio control module 112 shown in FIG. 1. In some cases, the algorithm can be implemented in an executable computing code, e.g., C/C++ executable code. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or another suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or the interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a method, comprising: determining, at a vehicle, a current driving mode of the vehicle; determining, at the vehicle, a plurality of audio output levels based on the current driving mode and one or more preconfigured audio zone profiles; and controlling, by the vehicle, audio equipment of the vehicle to output audio according to the plurality of audio output levels.

The foregoing and other described implementations can each, optionally, include one or more of the following features:

A first feature, combinable with any of the following features, wherein the controlling audio equipment of the vehicle to output audio according to the plurality of audio output levels comprise setting values of the plurality of audio output levels by using a signal structure defined by Vehicle Signal Specification (VSS).

A second feature, combinable with any of the previous or following features, wherein the controlling audio equipment of the vehicle to output audio according to the plurality of audio output levels further comprises sending the values of the plurality of audio output levels to the audio equipment by using the signal structure defined by VSS.

A third feature, combinable with any of the previous or following features, wherein the signal structure is based on the VSS of Connected Vehicle Systems Alliance (COVESA).

A fourth feature, combinable with any of the previous or following features, wherein the audio output levels include at least one of volume, fade, or balance.

A fifth feature, combinable with any of the previous or following features, wherein the audio equipment includes at least one of a front speaker or a rear speaker.

A sixth feature, combinable with any of the previous features, wherein the current driving mode include at least one of a nap mode or a highway mode.

In a second implementation, a vehicle, comprising: audio equipment; at least one hardware processor; and a computer-readable storage medium coupled to the at least one hardware processor and storing programming instructions for execution by the at least one hardware processor, wherein the programming instructions, when executed, cause the vehicle to perform operations comprising: determining a current driving mode of the vehicle; determining a plurality of audio output levels based on the current driving mode and one or more preconfigured audio zone profiles; and controlling the audio equipment of the vehicle to output audio according to the plurality of audio output levels.

The foregoing and other described implementations can each, optionally, include one or more of the following features:

A first feature, combinable with any of the following features, wherein the controlling audio equipment of the vehicle to output audio according to the plurality of audio output levels comprise setting values of the plurality of audio output levels by using a signal structure defined by Vehicle Signal Specification (VSS).

A second feature, combinable with any of the previous or following features, wherein the controlling audio equipment of the vehicle to output audio according to the plurality of audio output levels further comprises sending the values of the plurality of audio output levels to the audio equipment by using the signal structure defined by VSS.

A third feature, combinable with any of the previous or following features, wherein the signal structure is based on the VSS of Connected Vehicle Systems Alliance (COVESA).

A fourth feature, combinable with any of the previous or following features, wherein the audio output levels include at least one of volume, fade, or balance.

A fifth feature, combinable with any of the previous or following features, wherein the audio equipment includes at least one of a front speaker or a rear speaker.

A sixth feature, combinable with any of the previous features, wherein the current driving mode include at least one of a nap mode or a highway mode.

In a third implementation, a computer-readable medium storing instructions which, when executed, cause a computing device to perform operations comprising: determining, at a vehicle, a current driving mode of the vehicle; determining, at the vehicle, a plurality of audio output levels based on the current driving mode and one or more preconfigured audio zone profiles; and controlling, by the vehicle, audio equipment of the vehicle to output audio according to the plurality of audio output levels.

The foregoing and other described implementations can each, optionally, include one or more of the following features:

A first feature, combinable with any of the following features, wherein the controlling audio equipment of the vehicle to output audio according to the plurality of audio output levels comprise setting values of the plurality of audio output levels by using a signal structure defined by Vehicle Signal Specification (VSS).

A second feature, combinable with any of the previous or following features, wherein the controlling audio equipment of the vehicle to output audio according to the plurality of audio output levels further comprises sending the values of the plurality of audio output levels to the audio equipment by using the signal structure defined by VSS.

A third feature, combinable with any of the previous or following features, wherein the signal structure is based on the VSS of Connected Vehicle Systems Alliance (COVESA).

A fourth feature, combinable with any of the previous or following features, wherein the audio output levels include at least one of volume, fade, or balance.

A fifth feature, combinable with any of the previous or following features, wherein the audio equipment includes at least one of a front speaker or a rear speaker.

A sixth feature, combinable with any of the previous features, wherein the current driving mode include at least one of a nap mode or a highway mode.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may, instead, include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include, by way of example, a programmable processor, a computer, a system on a chip, or multiple ones, or combinations of the foregoing. A processor can include special purpose logic circuitry, e.g., a CPU (central processing unit), an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random-access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from, a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
   determining, at a vehicle, a current driving mode of the vehicle;
   determining, at the vehicle, a plurality of audio output levels based on the current driving mode and one or more preconfigured audio zone profiles; and
   controlling, by the vehicle, audio equipment of the vehicle to output audio according to the plurality of audio output levels, wherein the controlling audio equipment of the vehicle to output audio according to the plurality of audio output levels comprise setting values of the plurality of audio output levels by using a signal structure defined by a standardized signaling protocol.

2. The method of claim 1, wherein the standardized signaling protocol is specified according to Vehicle Signal Specification (VSS).

3. The method of claim 2, wherein the controlling audio equipment of the vehicle to output audio according to the plurality of audio output levels further comprises sending the values of the plurality of audio output levels to the audio equipment by using the signal structure defined by VSS.

4. The method of claim 2, wherein the signal structure is based on the VSS of Connected Vehicle Systems Alliance (COVESA).

5. The method of claim 1, wherein the audio output levels include at least one of volume, fade, or balance.

6. The method of claim 1, wherein the audio equipment includes at least one of a front speaker or a rear speaker.

7. The method of claim 1, wherein the current driving mode include at least one of a nap mode or a highway mode.

8. A vehicle, comprising:
   audio equipment;
   at least one hardware processor, and
   a computer-readable storage medium coupled to the at least one hardware processor and storing programming instructions for execution by the at least one hardware processor, wherein the programming instructions, when executed, cause the vehicle to perform operations comprising:
      determining a current driving mode of the vehicle;
      determining a plurality of audio output levels based on the current driving mode and one or more preconfigured audio zone profiles; and
      controlling the audio equipment of the vehicle to output audio according to the plurality of audio output, wherein the controlling the audio equipment of the vehicle to output audio according to the plurality of audio output levels comprise setting values of the plurality of audio output levels by using a signal structure defined by a standardized signaling protocol.

9. The vehicle of claim 8, wherein the standardized signaling protocol is specified according to Vehicle Signal Specification (VSS).

10. The vehicle of claim 9, wherein the controlling the audio equipment of the vehicle to output audio according to the plurality of audio output levels further comprises sending the values of the plurality of audio output levels to the audio equipment by using the signal structure defined by VSS.

11. The vehicle of claim 9, wherein the signal structure is based on the VSS of Connected Vehicle Systems Alliance (COVESA).

12. The vehicle of claim 8, wherein the audio output levels include at least one of volume, fade, or balance.

13. The vehicle of claim 8, wherein the audio equipment includes at least one of a front speaker or a rear speaker.

14. The vehicle of claim 8, wherein the current driving mode include at least one of a nap mode or a highway mode.

15. A non-transitory computer-readable medium storing instructions which, when executed, cause a computing device to perform operations comprising:
   determining, at a vehicle, a current driving mode of the vehicle;
   determining, at the vehicle, a plurality of audio output levels based on the current driving mode and one or more preconfigured audio zone profiles; and
   controlling, by the vehicle, audio equipment of the vehicle to output audio according to the plurality of audio output levels, wherein the controlling audio equipment of the vehicle to output audio according to the plurality of audio output levels comprise setting values of the plurality of audio output levels by using a signal structure defined by a standardized signaling protocol.

16. The computer-readable medium of claim 15, wherein the standardized signaling protocol is specified according to Vehicle Signal Specification (VSS).

17. The computer-readable medium of claim 16, wherein the controlling audio equipment of the vehicle to output audio according to the plurality of audio output levels further comprises sending the values of the plurality of audio output levels to the audio equipment by using the signal structure defined by VSS.

18. The computer-readable medium of claim 16, wherein the signal structure is based on the VSS of Connected Vehicle Systems Alliance (COVESA).

19. The computer-readable medium of claim 15, wherein the audio output levels include at least one of volume, fade, or balance.

20. The computer-readable medium of claim 15, wherein the audio equipment includes at least one of a front speaker or a rear speaker.

* * * * *